Oct. 26, 1965
M. B. BOEHLER
3,213,523
METHOD OF MAKING A MULTIPLE INJECTION MANIFOLD DEVICE
Filed March 22, 1962
3 Sheets-Sheet 1
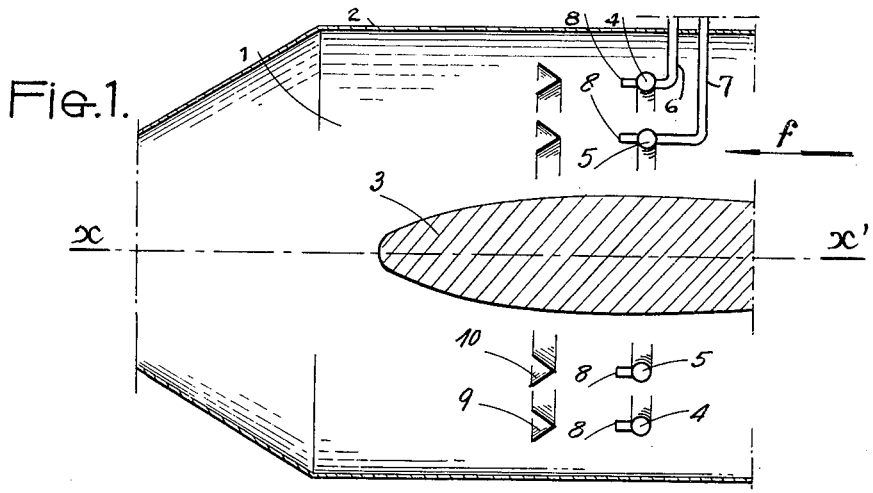
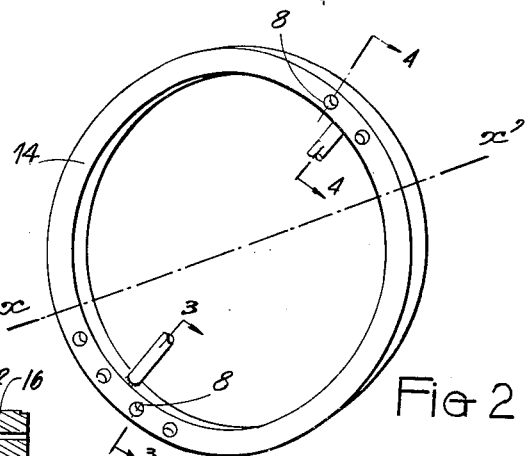
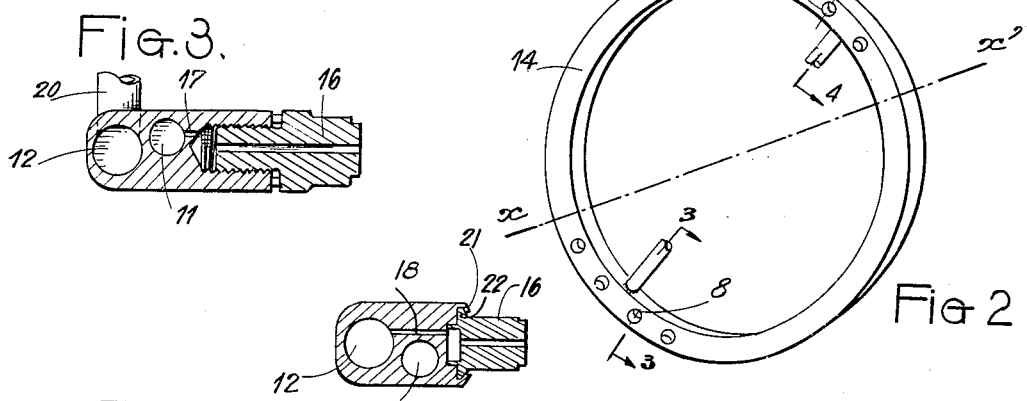
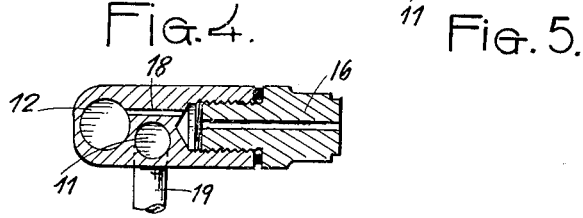
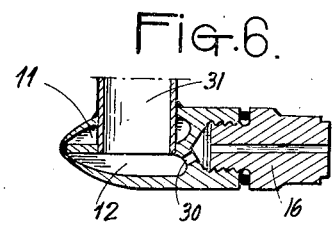
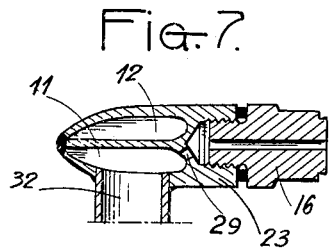
Inventor: Marius Bernard
Boehler
By: Karl W. Flocks
Attorney Oct. 26, 1965

M. B. BOEHLER  
METHOD OF MAKING A MULTIPLE INJECTION MANIFOLD DEVICE 3,213,523

Filed March 22, 1962

Inventor: Marius Bernard Boehler

By: Karl W. Flocks
Attorney

Oct. 26, 1965   M. B. BOEHLER   3,213,523
METHOD OF MAKING A MULTIPLE
INJECTION MANIFOLD DEVICE
Filed March 22, 1962   3 Sheets-Sheet 3

Inventor:
Marius Bernard Boehler
By: Karl W Flocks
Attorney

United States Patent Office 3,213,523
Patented Oct. 26, 1965

3,213,523
METHOD OF MAKING A MULTIPLE INJECTION MANIFOLD DEVICE
Marius Bernard Boehler, Chaville, France, assignor to Nord-Aviation Societe Nationale de Constructions Aeronautiques, Paris, France, a joint-stock company of France
Filed Mar. 22, 1962, Ser. No. 181,546
Claims priority, application France, Mar. 24, 1961, 856,770
1 Claim. (Cl. 29—157)

The present invention relates to a multiple injection ring or manifold for a ram-jet or for a turbo-jet afterburning device.

The injection devices utilized to bring the fuel into the combustion chamber of a ram-jet unit or into the after-burning chamber of a turbo-jet unit are formed by distribution conduits or manifolds carrying the injectors. It is essential that these devices should be capable of permitting a variation of the flow-rates of fuel over a wide range, in order that the propulsion unit may be able to operate over a sufficiently wide range of conditions of flight and of power required.

In order to obtain this result, the following solutions are adopted: either the injectors are operated under very different conditions of pressure and flow-rate, or alternatively the supply is cut-off in one or more of the manifolds of the injection device employed. The first solution leads in certain cases to bad vaporization of the fuel. The second solution results in poor distribution of the fuel over the flame-holders and in the entire combustion chamber, while increasing, because of the number of the manifolds and their couplings, the weight, the internal aerodynamic drag and also the constructional difficulties in order to ensure fluid-tightness.

The present invention has for its object a multiple manifold which obviates all these drawbacks, by assembling together a number of elementary manifolds in such a manner that the combined unit has exactly the same appearance as if it were a single manifold on which the injectors are all mounted in the same manner, irrespective of the elementary manifold of which they form part.

The multiple injection manifold according to the invention comprises a unitary ring in which are machined $n$ elementary manifolds coaxial to each other and to the ring: cavities being provided on the said ring, said cavities being identical with each other both in their shape and in their orientation with respect to the axis of the said ring, by the mounting of the injectors, the bottom of each cavity communicating by a channel with one of the elementary manifolds; each elementary manifold receives the fuel through at least one feed tube; and the injectors of the $n$ elementary manifolds alternate successively and uniformly between each other on the said ring.

The $n$ elementary manifolds preferably comprise the same number of injectors, $n$ successive injectors on the same multiple manifold each communicating in this case with a different elementary manifold.

A plurality of multiple manifolds according to the invention may be assembled together, and the supply of the corresponding elementary manifolds may be effected in common.

The invention also includes two methods of manufacture of the present multiple manifold, one method comprising the drilling and machining of rod elements and the other method including the machining of a ring.

Further features and advantages of the invention will become apparent from the description which follows below of preferred forms of embodiment of the invention, reference being made to the accompanying diagrammatic drawings, in which:

FIG. 1 is a longitudinal section of a combustion chamber of a ram-jet unit equipped with conventional supply manfolds.

FIGS. 2, 3 and 4 are respectively a perspective view of the double manifold, FIG. 3 being a transverse section taken along the line 3—3 of FIG. 2 and FIG. 4 being a transverse section along the line 4—4 of FIG. 2, in a first form of embodiment of the invention.

FIG. 5 represents a transverse section of the double manifold, showing an alternative form of fixation of an injector on the double manifold. FIGS. 6 and 7 relate to a second form of embodiment of the invention, and show respectively a transverse section of a double manifold taken at a region corresponding to that shown by section along the same lines 3—3 and 4—4 of FIG. 2.

Figure 8:
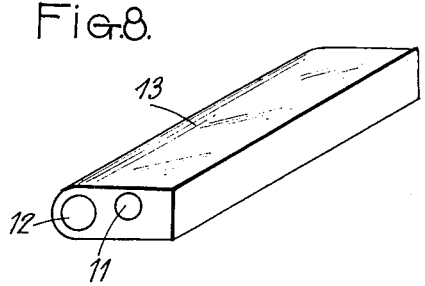
FIG. 8 is a perspective view of a section of rod bored and machined.

In FIG. 1, the combustion chamber 1 of a ramjet unit having a longitudinal axis $x$–$x'$ is limited by the outer wall 2 and by the central body 3. It comprises the conventional circular and coaxial manifolds 4 and 5, supplied by the feed tubes 6 and 7. Injectors 8 are distributed uniformly along these manifolds and the jet of fuel discharged from these injectors strikes the flame-holders 9 and 10.

It should here be observed that the injectors 8 are directed in the sense of the arrow $f$, on the downstream side of the flow of air passing through the ramjet. They could be mounted in the opposite direction. This observation is applicable to all the forms of embodiment described hereinafter.

Figure 9:
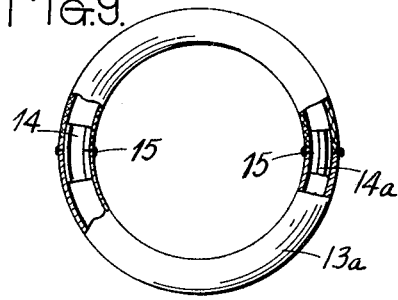
FIG. 9 shows the assembly of two of these rod sections.
Figure 10:
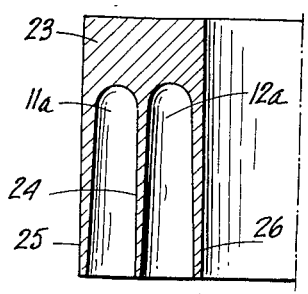
FIGS. 10, 11 and 12 show the successive stages of machining of a ring.

In FIGS. 2, 3, 4, 8 and 9, two elementary conduits or manifolds 11 and 12 are drilled through the mass of two straight bar sections 13 (see FIG. 8) which, after having been bent and formed into half-rings 13$a$, are placed end to end and coupled to each other by two internal sleeves 14 and 14$a$ and the welds 15 (see FIG. 9).

The profiles of the sections 13 are machined before bending, starting from the position of the bored conduits.

The ring having a longitudinal axis $x$–$x'$ thus constituted, is then drilled and tapped at regular intervals to receive the injectors 16. In the bottoms of the cavities thus formed, channels 17 and 18 are bored in order to provide a communication of this bottom with the conduit 11 or with the conduit 12.

The coupling of the conduits 11 and 12 to one of the supply tubes 19 and 20 does not present any difficulty. It is only necessary to drill the manifold at the desired points, to introduce into the holes thus made either of the supply tubes 19 and 20 and then to fix them by welding.

FIG. 5 shows the section of a double manifold similar to the manifold of FIGS. 2, 3 and 4, but in which each injector 16 is fixed in the corresponding cavity of the ring by insetting, the extremity 21 of the edges of the cavity being bent back over a shoulder 22.

In FIGS. 6, 7, 10, 11, 12 and 13, the multiple manifold is produced from a ring 23 (FIGS. 10 to 13) having a longitudinal axis $x$–$x'$ and forged in a single piece. Two adjacent grooves 11$a$ and 12$a$ (FIGS. 10 and 11), formed by machining, constitute the beginnings of the conduits 11 and 12.

With regard to the three partitions which define these grooves 11$a$ and 12$a$, the intermediate partition 24 has parallel sides, while the two end partitions 25 and 26 have the form of a beam of equal strength, built-in at one of its extremities.

Cavities uniformly distributed along a circumference of the ring 23 are then drilled and tapped as in the first form of embodiment, so as to receive the injectors 16. Channels 29 and 30 are also pierced in the bottoms of the said cavities (FIG. 11) so as to provide a communication either with the conduit 11 or with the conduit 12.

Figure 12:
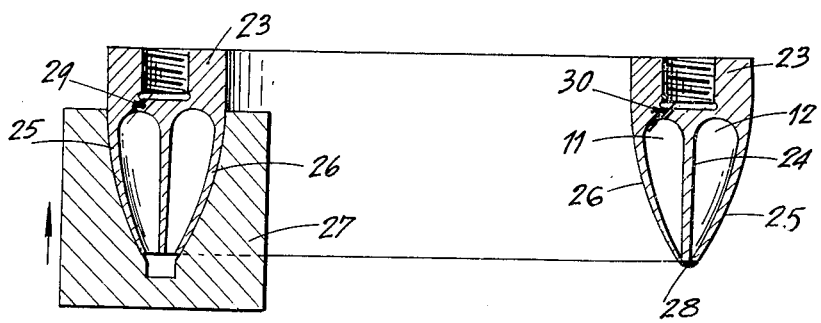

The two end partitions 25 and 26 are then bent inwards on to the intermediate partition 24, by using a matrix or former 27. When they are once in position on the intermediate partition 24, the three partitions thus joined together are made equal and are welded together at 28 over the entire periphery of the ring 23. The left-hand section of FIG. 12 shows the forming operation during the course of manufacture, the right-hand section of the same figure showing the two conduits 11 and 12 obtained after completion of the weld at 28.

Figure 13:
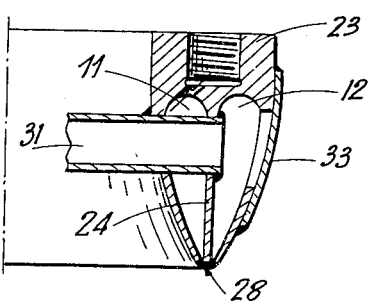
FIG. 13 shows the coupling of one of the fuel supply tubes to the corresponding elementary manifold.
Figure 11:
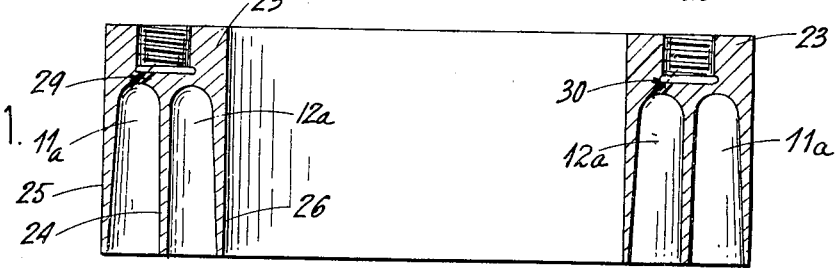

The fuel supply tubes 31 and 32 are then placed in position. As regards the tube 32, it is only necessary to pierce a hole at the desired place in the ring 23, to introduce the tube 32 into it and then to fix the tube by welding (FIG. 7). The operation is rather more complicated with respect to the tube 31: it is necessary to pierce a hole through the three partitions of the ring, to pass the tube 31 into two of these holes, take advantage of the existence of the third hole so as to weld the end of the tube 31 on the central partition 24, in addition to weld the said tube on a side partition and to close the last hole by welding over it a suitable small plate 33 (FIG. 13).

Figure 14:
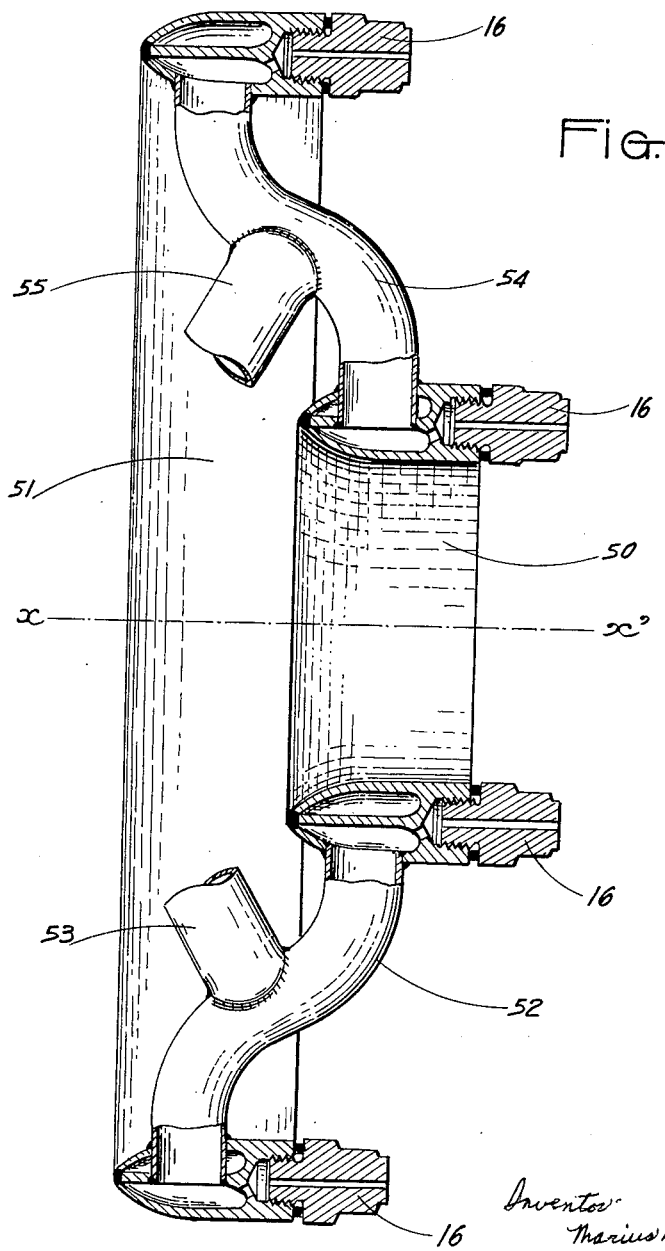
FIG. 14 shows a partial cross-section of an assembly of two double manifolds.

In FIG. 14, two double manifolds 50 and 51, similar to the form of embodiment of FIGS. 6 and 7, are assembled to each other in slightly displaced planes. An elementary manifold of one of the double manifolds is joined to an elementary manifold of the other double manifold by a coupling 52 into which opens the supply tube 53. The other elementary manifolds are connected to each other in the same way by a further coupling 54 into which delivers the supply tube 55.

The method of operation of the multiple manifold according to the invention is clearly brought out in the foregoing description. The multiple manifold can operate with one elementary manifold only or with both, without affecting the general distribution of the fuel in the combustion chamber, and especially on the flame-holders.

I claim:

A method of manufacture of a multiple fuel-injection manifold for ram-jet units or for turbo-jet after-burning devices, said method comprising the steps of: starting with a ring of metal forged in one piece and having at least one flat face; machining two open channels longitudinally in said flat face so as to give said ring a cross-section having two channels and three partitions, the two outer partitions having sections tapering from the bottoms of said channels to their open extremities, the central partition having parallel walls; drilling and tapping holes in the face of said ring opposite to said flat face, said tapped holes being uniformly distributed in the same plane, for receiving fuel-injection nozzles; piercing a fuel passage at the bottom of each said hole, said passages communicating with the corresponding channels; bending said outer partitions inwards towards said central partition by forming in a matrix; equalizing the lengths of said partitions and welding them together along their outer edges to form annular conduits; coupling a fuel supply pipe to each said annular conduit, for one conduit by drilling a hole laterally in one of said outer partitions, inserting the pipe extremity and welding to the outer face of said outer partition, for the other conduit by piercing a hole right through the three partitions, inserting the pipe through one outer partition and the central partition and fixing by welding to said central partition, making use of the free hole in the other outer partition; and closing said free hole by a small plate welded in position.

References Cited by the Examiner

UNITED STATES PATENTS

| 445,854 | 2/91 | Lawrence | 29—463 |
| 1,653,468 | 12/27 | Payne et al. | |
| 2,569,248 | 9/51 | Miller | 29—463 |
| 2,896,975 | 7/59 | Wahl et al. | |
| 3,003,227 | 10/61 | Haag | 29—156.4 |
| 3,102,392 | 9/63 | Bauger et al. | 60—39.74 X |

FOREIGN PATENTS

| 574,168 | 4/33 | Germany. |
| 693,932 | 7/53 | Great Britain. |

WHITMORE A. WILTZ, *Primary Examiner.*

JULIUS E. WEST, *Examiner.*